July 19, 1932.   N. TRBOJEVICH   1,867,782
METHOD OF AND MACHINE FOR GENERATING WORM GEARS
Filed Nov. 19, 1928   2 Sheets-Sheet 1
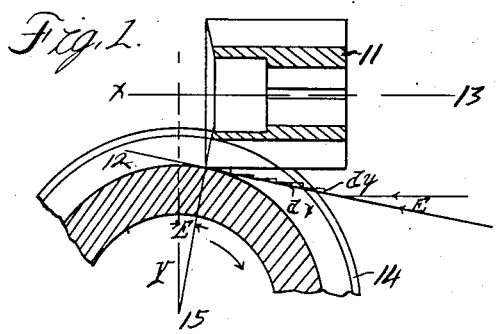
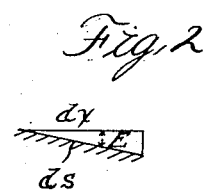
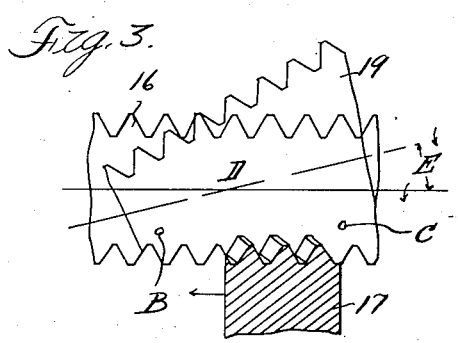
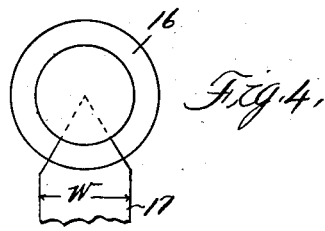
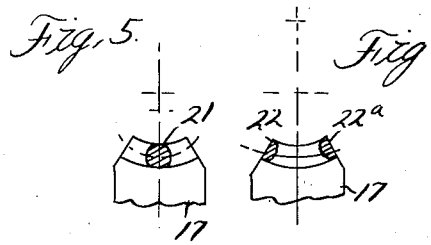
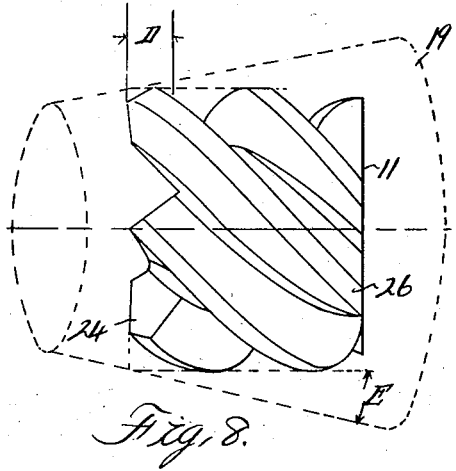
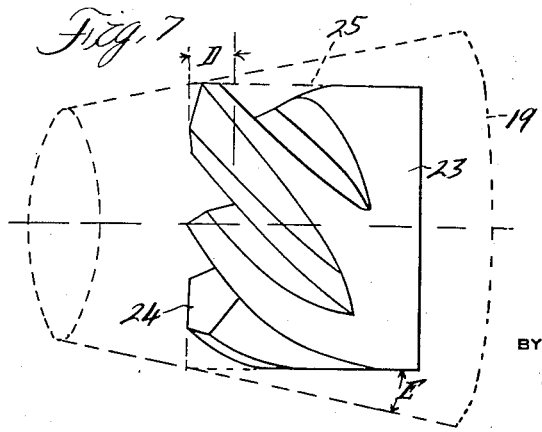
INVENTOR
Nikola Trbojevich
BY
ATTORNEYS July 19, 1932. N. TRBOJEVICH 1,867,782
METHOD OF AND MACHINE FOR GENERATING WORM GEARS
Filed Nov. 19, 1928  2 Sheets-Sheet 2
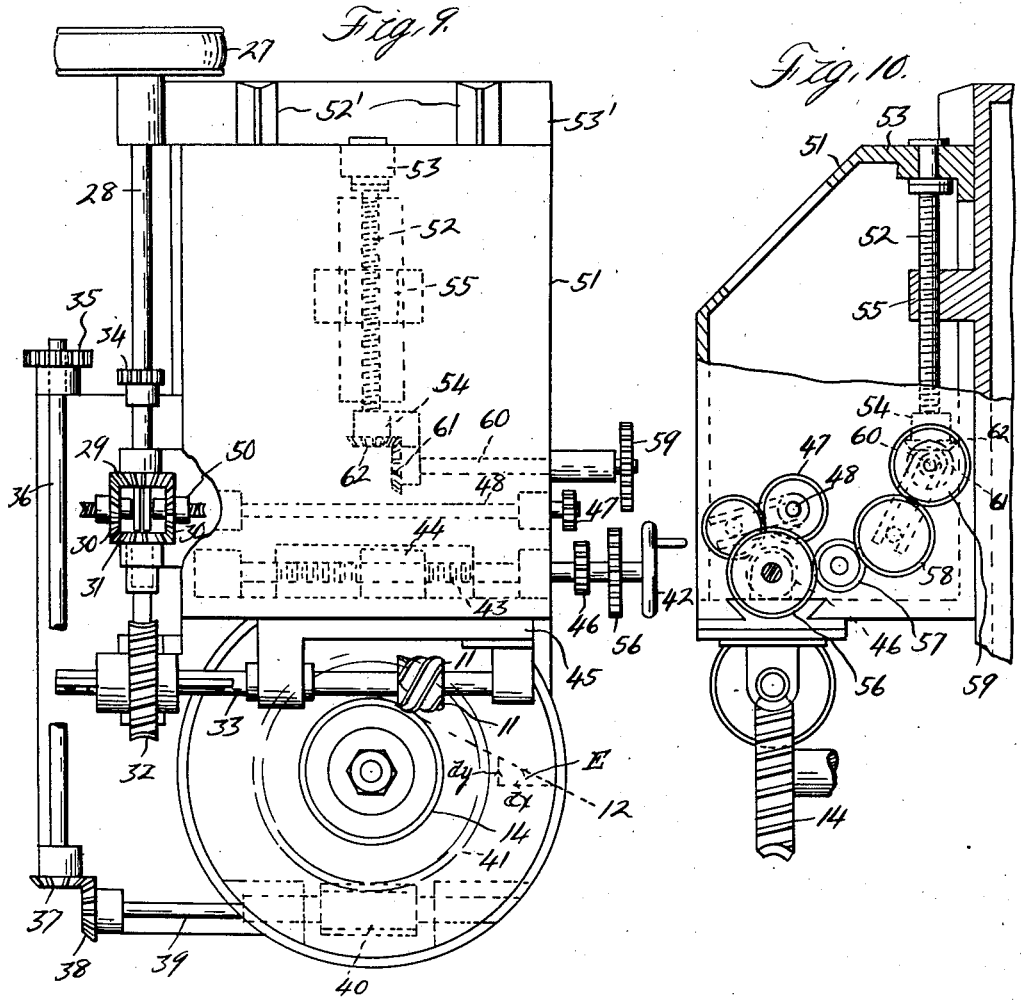
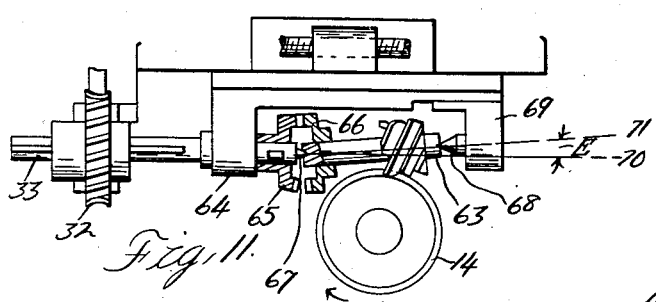
INVENTOR
Nikola Trbojevich
BY
ATTORNEYS Patented July 19, 1932

1,867,782

UNITED STATES PATENT OFFICE

NIKOLA TRBOJEVICH, OF HIGHLAND PARK, MICHIGAN

METHOD OF AND MACHINE FOR GENERATING WORM GEARS

Application filed November 19, 1928. Serial No. 320,492.

The invention relates to a novel method of generating worm gears and a machine used in connection therewith.

In carrying out the new method of generating gears I employ a hob of the type described in my co-pending applications, Serial Nos. 161,162, filed January 14, 1927 and 297,766, filed August 6, 1928. Such hobs have as their first novel characteristic a non-relieved thread of uniform cross section throughout its length which permits the end of the thread to be reground as often as desired without changing the form of the thread. In order to provide clearance for the teeth during cutting, the hob engages the work in a conical fashion and thereby generates its own cutting clearance.

The primary object of this invention is to simplify the manufacture of worm gearing and to reduce the tool cost.

Another object is to insure a perfectly uniform product at the beginning and the end of life of each and every cutter.

Still another object is to produce more accurate cutting tools of the type that may be ground all over after hardening.

In the drawings:

Figures 1 and 2 are geometrical diagrams explaining the new method of obtaining cutting clearance in a worm hob;

Figures 3, 4, 5 and 6 are geometrical diagrams explaining the principle of determining the correct tooth form in the new hobs;

Figure 7 diagrammatically shows a new hob, the cutting thread of which is only partly completed;

Figure 8 shows the hob in Figure 7 when the cutting thread is completed;

Figure 9 is a plan view of my improved worm gear hobbing machine;

Figure 10 is a side elevation of the machine shown in Figure 9;

Figure 11 is a fragmentary view of another hobbing machine showing a modification of the principle of construction different from the one embodied in the hobbing machine shown in Figures 9 and 10.

The principle upon which this method of gear cutting is based, will best be understood from Figure 1. The cylindrical hob 11 has an axis of rotation 13 which is tilted in the plane of paper at an angle E relative to the line of the tangential feed 12. The worm gear blank 14 rotates about its axis 15 at a constant velocity, but otherwise remains stationary during the cut. The hob 11 rotates about its axis 13 and is also bodily translated parallel to the feed line 12.

The translation of the hob along the said feed line 12 may be resolved into two components at right angles to each other, the said components being respectively parallel to the coordinate axes X and Y, Figure 1. Thus, assuming an infinitesimal translation $ds$, Figure 2, the two components of the line 12 will be $dx$ and $dy$ respectively, the relation existing $$\frac{dy}{dx} = \tan E \quad (1)$$

where E is the clearance angle.

The method of obtaining the cutting clearance may now readily be visualized. Suppose that we feed the hob first axially along the short distance $dx$ into the work and immediately afterwards at right angles thereto along another short distance $dy$ away from the work. The last named component by actually taking the hob away from the work produces a cutting relief with the result that the cutting edges A will cut freely and without rubbing.

As the components $dx$ and $dy$ are acting at all times simultaneously and continuously, it follows that the relief will continuously be generated as the cutting progresses.

The method of generating the correct tooth form in the new hob to produce a work piece of a predetermined contour will now be briefly explained. From what already has been said it is clear that the new hob engages the work in a conical fashion, the angle of the imaginary cone being determined from the required clearance angle E. Thus, in Figure 3 the new hob is supposed to cut the same profile as the straight worm 16 would generate. However, the cutting edges of the new hob should be copied from the taper worm 19, said worm having a cone angle exactly corresponding to the clearance angle E which it is desired to employ. In my experiments I found that an angle E equal to 6 degrees is satisfactory for cutting bronze.

The procedure of generating the hob tooth curves is the following: A lathe tool 17 having a width W, Figure 4 corresponding to the width of the gear to be cut is so finished that it will fit exactly over the straight worm 16 with a surface contact. Said tool is then used to chase a taper worm 19. It is necessary now to find a region in the said taper worm from which to copy the tooth curves. At the region B, Figures 3 and 5, the taper worm has an imperfect contact with the chasing tool 17 as indicated by the shaded area 21, said contact area being disposed at about the middle portion of the mating tooth. Again, at the region C, Figures 3 and 6, the contact area 22 and 22a is again imperfect, only in the other sense than previously, in that the contact area is now split in two halves at the two corresponding ends of the mating tooth. There is, therefore, an intermediate region D, Figure 3, at which the contact covers practically the entire area of the mating gear tooth shown in Figures 5 and 6, and the cutting edges of the new hob will be selected to lie in the said region or zone D.

Figure 7 shows a new hob 23 only partially completed. In the zone D of the taper worm 19 the cutting facets 24 are formed, one facet for each worm thread. The outside diameter 25 of the partially completed hob 23 is turned down cylindrically along the axis 13 using the outlines of the facets 24 as a guide.

In Figure 8 a completed hob 11 is shown. That form was obtained from the partially completed hob 23 shown in Figure 7 by chasing the inside contours of the hob teeth 26 in the form of true helicoids of a constant lead, the contour of the said helicoid being copied from the contours of the facets 24 and the lead determined experimentally as was indicated in my above mentioned application, Serial No. 297,766.

It is now readily seen that inasmuch as the body of the hob 11 falls always inside of the taper worm 19 except at the cutting facets 24, the hob will engage the work in the fashion of the taper worm with its front ends only and will not rub over the already finished surfaces with any other portion of its threads. It is also evident that the new hob 11 may be resharpened indefinitely without changing its cutting contour or its cutting qualities in the least.

Figures 9 and 10 show the plan view and the side elevation respectively of my improved hobbing machine.

The hob 11 is driven from the pulley 27 through the splined shaft 28, the differential gears 29, 30 and 31, the worm and worm gear 32, and the splined hob spindle 33.

The work 14 is driven from the pulley 27 through the splined shaft 28, the timing gears 34 and 35, the shaft 36, the two miters 37 and 38 respectively, the shaft 39, the worm 40 and the table worm gear 41.

The tangential feed of the hob 11 relative to the work 14 is effected by rotating the hand wheel 42 and thereby the feed screw 43, said screw engaging the corresponding nut 44 formed integral with the hob slide 45. All these details are copied from a standard hobbing machine and will, therefore, be only briefly described. The compensation in the rotation of the hob 11 to allow for the tangential feed, as it will be understood, is effected through the change gears 46 and 47, the cross shaft 48, a worm (not shown) mounted at the end thereof, the worm gear 49 and the differential spider 50 in the usual manner.

The novel feature in this hobbing machine is the additional feed movement at right angles to the travel of the hob slide 45, i. e. along the component $dy$ to produce the cutting clearance according to this method.

As is seen from Figures 9 and 10, the cutter 11, the cutter slide 45 and the actuating gearing and shafting are all mounted in the cutter head 51 which is a large casting longitudinally slidable over the two parallel ways 52' at the top of the base casting 53. The motion of the cutter head 31 to and from the work 14 is effected by means of the screw 52 mounted in two bearings 53 and 54 respectively in the cutter head and engaging the stationary nut 55 integral with the base casting 53. When the hand wheel 42 is rotated, the rotation is transmitted through the change gears 56, 57, 58 and 59 to the cross shaft 60 and the miters 61 and 62 to the screw 52, thus causing the above mentioned infeed which produces the cutting clearance.

From what already has been said, it will be clear that the translation of the hob parallel to the feed screw 43 (producing the component $dx$) and the translation parallel to the screw 52 (producing the component $dy$) are so timed that their ratio is exactly equal to the tangent of the clearance angle E; thus, producing a resultant translation along the straight line 12, Figure 9.

A modification of the above described new hobbing machine is diagrammatically illustrated in Figure 11. In that arrangement the timed infeed parallel to the screw 52, Figure 9 is entirely omitted and to replace it, the kinematically equivalent means of tilting the hob arbor 63 at an angle E relative to the axis of the screw 43 is employed. This idea leads to a modification of the cutter head 45 as illustrated in Figure 11.

The splined shaft 33 is driven from the worm gear 32 and ends at a short distance to the right from the bearing 64 in the hob slide 45. Upon this extremity a bevel gear 65 is keyed, capable of meshing with the similar bevel gear 66 mounted at the corresponding end of short hob arbor 63. Said hob arbor carries the hob 11 and is rotatably mounted between two centers 67 and 68, the first being formed at the end of the splined shaft 33 and the other rigidly held in the adjustable tail stock 69. When the feed screw 43 is rotated, the hob slide 45 will move parallel to the axis 70 of the shaft 33, while the hob will rotate about its axis 71, said two axes including the aforementioned clearance angle E. This arrangement produces exactly the same cutting action of the hob 11 in that the same engages the work 14 in a conical fashion and is fed along a tangent to the root circle of the said work.

From the foregoing description it will be seen that in practicing this method I am not limited and do not wish to limit myself as to the numbers of teeth and the helical angles which the cutter 11 and the gear to be cut 14, Figure 1, may assume. Thus, if the cutter has only a few teeth and the gear 14 has many, the said gear is what is ordinarily called a worm gear. If both members 11 and 14 have each many teeth (say, over ten) the gear 14 becomes a "hollow faced spiral gear". If, finally, the member 11 has many teeth and the member 14 only a few, the last member becomes a globoid worm. All these types may be generated by this method and I am using the term worm gear in its broad sense, meaning a gear having a hollow face and having one or more spiral threads or teeth wound about its circumference.

What I claim as my invention is:

1. A method of generating worm gears consisting in rotating a hob of the solid worm cylindrical type capable of meshing with the gear to be cut in a conical fashion, in rotating the blank in a timed relation, in imparting to the hob a relative feed movement in a direction tangential to the said blank, the direction of the said feed intersecting the hob axis at a predetermined angle depending upon the degree of cutting clearance employed and in continuing the said feed movement until the hob traverses the blank from end to end and finishes all points of the possible contact with the blank.

2. A method of generating worm gears consisting in rotating a cylindrical helical cutter having all its cutting edges formed in the front end of the said cutter and having all its threads of the same contour, diameter and thickness throughout their lengths, in rotating the blank in a timed relation and in imparting to the cutter a translation relative to the blank in a path tangential to the blank and intersecting the cutter axis at a predetermined cutting clearance angle.

3. A method of generating worm gears consisting in rotating a hob, the cutting teeth of which are solid helical threads of the same diameter and cross section throughout their lengths and equidistant from the hob axis, said threads having a contour so generated that it is capable of meshing with the gear to be cut in the fashion of a taper gear, in rotating the blank in a timed rotation and in imparting to the hob a relative translation in a direction transverse to the axis and tangential to the pitch surface of the work in order to generate hollow tooth faces in the work corresponding to the curvature of the cutter.

4. A method of generating worm gears consisting in rotating a hob capable of meshing with its cutting edges with the gear to be generated, in rotating the blank in a timed relation and in imparting to the hob a bodily translation tangential relative to the blank and disposed at an angle to the hob axis to obtain cutting clearance.

5. In the method of hobbing worm gears by the tangential process, the method of obtaining cutting clearance in an unrelieved cutter consisting in imparting to the cutter in addition to its customary tangential feed another feed motion at right angles thereto and away from work, the said two feeds being in a timed relation during the cutting process.

6. A worm gear hobbing machine comprising a work and a hob arbor, means for rotating the two arbors in a timed relation and means for imparting to the hob arbor a relative translation in a direction tangential to the blank transverse to the blank axis, and at an acute angle relative to the axis of the said hob arbor in such a manner that the shortest distance between the work and the hob axis constantly varies during the cut.

7. A machine for hobbing worm gears comprising a work arbor, a slide, a hob arbor mounted in said slide, the said slide being movable in a plane at right angles to the work arbor, means for rotating the two arbors in a timed relation and means for imparting to the slide two simultaneous feed movements in a timed relation, one in the direction of the slide and the other at right angles thereto and away from the work, to obtain cutting clearance.

8. A machine for hobbing worm gears comprising a work arbor, a hob arbor mounted in a slide and slidable in a plane perpendicular to the work arbor, means for rotating the two arbors in a timed relation, means for feeding the hob lengthwise tangentially relative to the work, a compensating gearing to compensate for the tangential feed, means for feeding the hob simultaneously away from the work in order to obtain cutting clearance and means for synchronizing the two feed motions in a predetermined ratio corresponding to the tangent of the clearance angle.

In testimony whereof I affix my signature.

NIKOLA TRBOJEVICH.